United States Patent Office 3,373,978
Patented Mar. 19, 1968

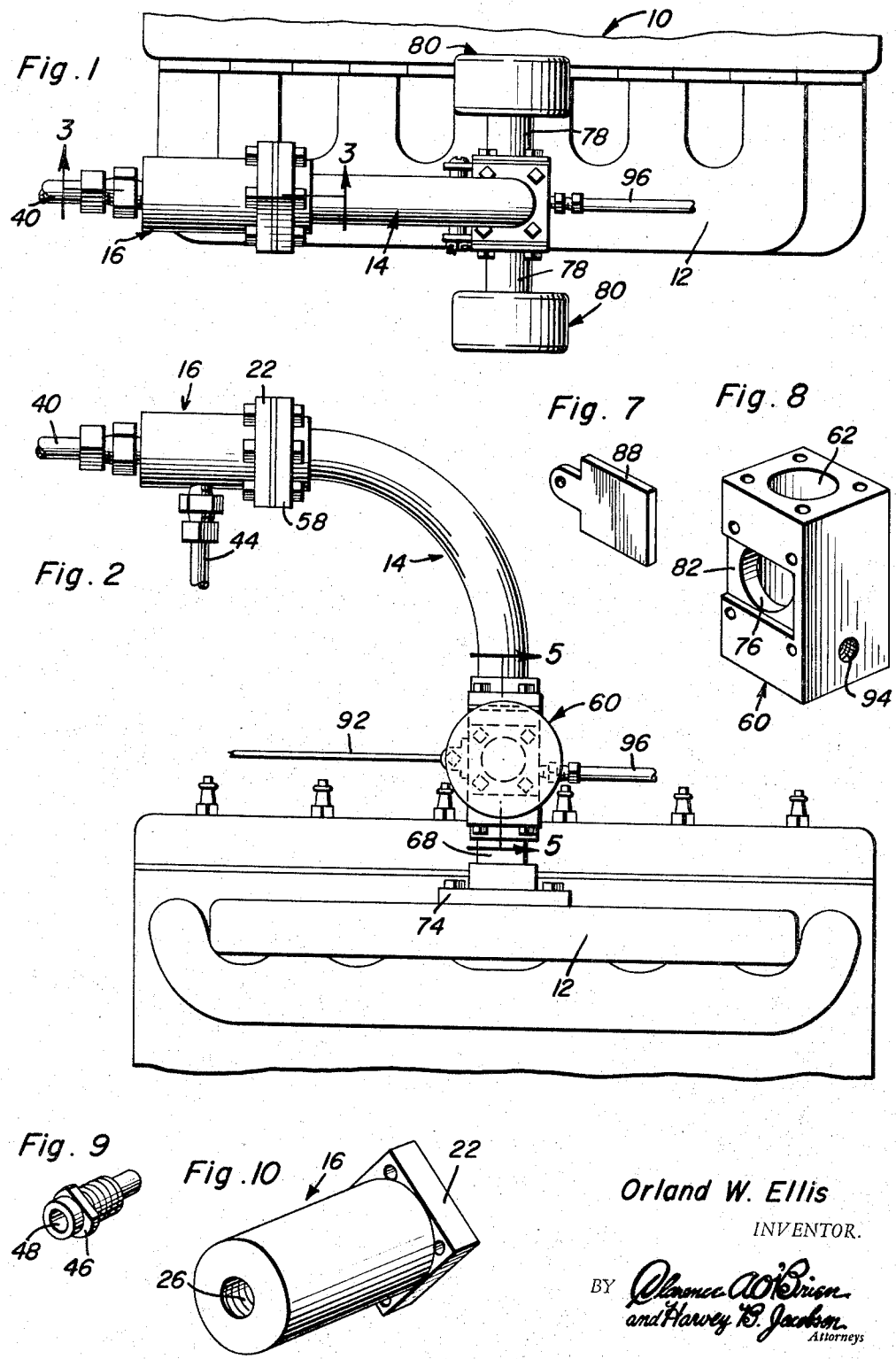
March 19, 1968 — O. W. ELLIS — 3,373,978
CHARGE-FORMING DEVICE FOR INTERNAL COMBUSTION ENGINES
Filed Oct. 12, 1965 — 2 Sheets-Sheet 1
Orland W. Ellis
INVENTOR.

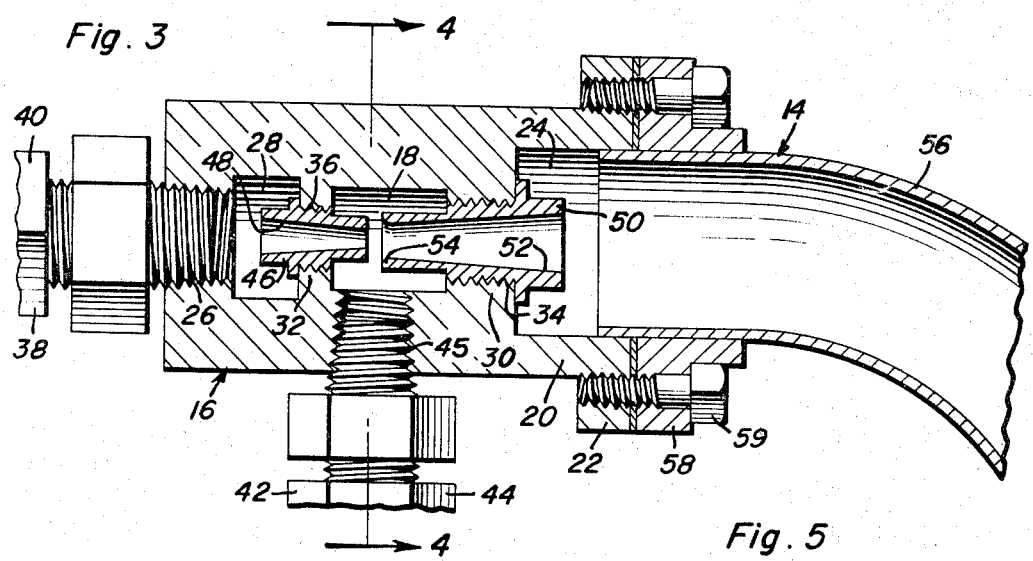
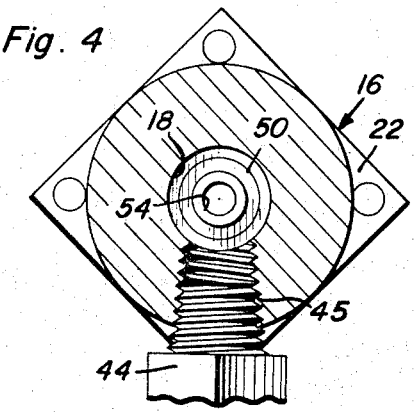
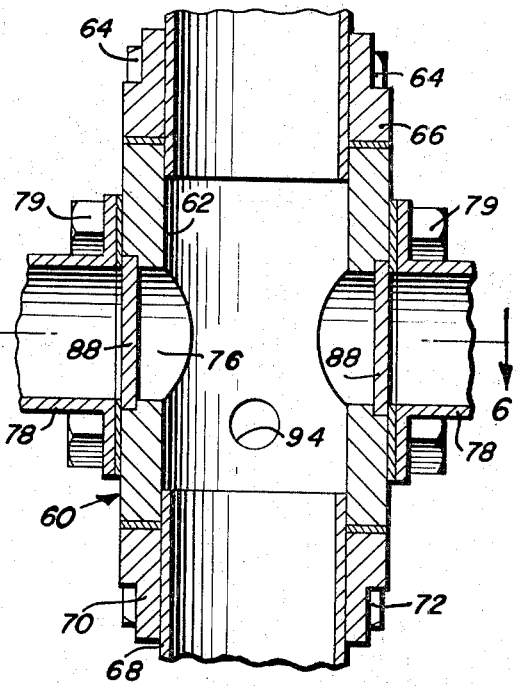
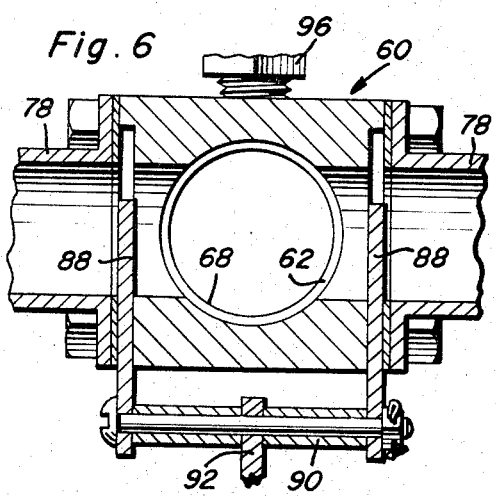
Orland W. Ellis
INVENTOR.

3,373,978
CHARGE-FORMING DEVICE FOR INTERNAL
COMBUSTION ENGINES
Orland W. Ellis, 411 Gibbs Road,
Warrington, Fla. 32507
Filed Oct. 12, 1965, Ser. No. 495,244
1 Claim. (Cl. 261—16)

ABSTRACT OF THE DISCLOSURE

An apparatus utilizing a relatively small quantity of air under pressure to form a partial vacuum adjacent a jet of pressurized air for drawing quantities of liquid fuel into said jet of air to be broken up into fine droplets and at least substantially vaporized by said jet of air, the jet of air and vaporized fuel being then discharged into the inlet end of intake air passage means of an associated internal combustion engine subject to engine vacuum and subsequently mixed with metered fresh air before passing out the outlet end of said intake air passage means.

---

This invention relates to a novel and useful charge-forming device for internal combustion engines utilizing liquid fuel and includes means by which liquid fuel and air may be mixed in an improved manner and in the proper proportions so as to obtain optimum performance from the associated internal combustion engine.

The charge-forming device of the instant invention is adapted to be utilized in conjunction with an initial source of air under pressure and includes means defining a vacuum-forming chamber into which the liquid fuel is discharged and through which a jet of air under high pressure is passed to form a vacuum in the chamber. By communicating a source of liquid fuel with a jet discharge of air under high pressure forming a vacuum within a chamber, the liquid fuel is thoroughly mixed with the jet of air and with the latter serving to draw into the vacuum chamber additional quantities of fuel. The fuel-and-air mixture resulting from the air and fuel being mixed together in the vacuum chamber may be considered a super rich air-and-fuel mixture and this mixture is then ducted to a suitable second mixing chamber through a suitable conduit communicated with the interior of the intake manifold of the associated internal combustion engine and the second mixing chamber includes throttled fresh air inlet means responsive to engine throttle setting and operative to mix additional quantities of fresh air from the ambient atmosphere with the super rich air-and-fuel mixture ducted to the second mixing chamber. The subsequent mixing of fresh air from the ambient atmosphere with the super rich air-and-fuel mixture ducted to the second mixing chamber results in the ultimate air-and-fuel mixture delivered to the internal combustion engine comprising an air-and-fuel mixture in which the liquid fuel is substantially completely vaporized. Of course, the substantially complete vaporization of the liquid fuel in a fuel-and-air mixture used by an internal combustion engine results in greater power, better fuel economy, and less objectionable by-products of combustion such as carbon monoxide, unburned particles of fuel and other elements which tend to support the formation of "smog" conditions in the metropolitan areas of this country having high vehicular populations.

The main object of this invention is to provide an air and fuel mixing device constructed in a manner whereby liquid fuel and air mixed therein will result in a fuel-and-air mixture in which the liquid fuel is substantially completely vaporized.

Another object of this invention is to provide a charge-forming device for internal combustion engines which will be readily adaptable to use on substantially all existing internal combustion engines.

A final object of this invention to be specifically enumerated herein is to provide a charge-forming device in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the charge-forming device of the instant invention shown operatively associated with the intake manifold of an internal combustion engine;

FIGURE 2 is a side elevational view of the embodiment illustrated in FIGURE 1;

FIGURE 3 is an enlarged fragmentary vertical sectional view taken substantially upon the plane indicated by the section line 3—3 of FIGURE 1;

FIGURE 4 is a fragmentary transverse vertical sectional view taken substantially upon the plane indicated by the section line 4—4 of FIGURE 3;

FIGURE 5 is a fragmentary enlarged vertical sectional view taken substantially upon the plane indicated by the section line 5—5 of FIGURE 2;

FIGURE 6 is a fragmentary horizontal sectional view taken substantially upon the plane indicated by the section line 6—6 of FIGURE 5;

FIGURE 7 is a perspective view of one of the gate valve members utilized to adjustably meter the intake of fresh air from the ambient atmosphere;

FIGURE 8 is a perspective view of the valve body or mixing chamber body utilized to mix a super rich air-and-fuel mixture with air from the ambient atmosphere;

FIGURE 9 is a perspective view of the compressed air inlet nozzle of the instant invention; and FIGURE 10 is a perspective view of the vacuum chamber forming body in which compressed air and liquid fuel are mixed to form a super rich air-and-fuel mixture.

Referring now more specifically to the drawings, the numeral 10 generally designates an internal combustion engine including an exhaust manifold 12. The feeder valve and damper of the instant invention is generally referred to by the reference numeral 14 and is utilized on the internal combustion engine 12 in lieu of a conventional carburetor or fuel injection assembly.

The assembly 14 includes a first body generally referred to by the reference numeral 16 which is elongated and defines an elongated liquid fuel and air mixing chamber 18 extending generally axially of the body 16. The body 16 further includes an outlet end which is open and includes an apertured mounting flange 22 disposed about the outlet end of a discharge chamber 24 also formed within the body 16. The other end of the body 16 has an axially extending threaded bore 26 formed therein which opens inwardly into an inlet chamber 28. The chamber 18 is separated from the chambers 24 and 28 by means of transversely extending partitions 30 and 32, respectively, including threaded apertures or bores 34 and 36.

The discharge end 38 of a pressurized air conduit 40 is communicated with and removably threadedly secured in the bore 26 and the outlet end 42 of a liquid fuel conduit 44 is threadedly removably secured in a threaded transverse bore 45 formed in the body 16 and opening into the chamber 18.

An injection nozzle 46 is removably threadedly secured in the bore 36 and includes a tapered bore or passage 48 extending axially therethrough including an inlet end disposed in the chamber 28 of a diameter substantially twice the diameter of the outlet end disposed within the chamber 18. An outlet nozzle 50 is threadedly and removably secured in the partition 30 and includes a tapered bore or passage 52 extending therethrough axially aligned with the passage 48 and including an inlet end slightly axially spaced from the outlet end of the inlet nozzle 46 and of a diameter substantially twice the diameter of the adjacent outlet end of the inlet nozzle 46. The inlet end of the passage 52 is slightly flared as at 54 defined by 1/16" radius of curvature.

The inlet end of the bore 45 opens at right angles to and in axial alignment with the proximate center of the space between the outlet and inlet ends of the nozzles 46 and 50 and one end of a curved super-rich fuel and air mixture conduit 56 is removably secured in the open end of the discharge chamber 24 by means of an apertured mounting flange or collar 58 secured to the flange 22 in any convenient manner such as by threaded fasteners 59.

The assembly 14 also includes a second body generally referred to by the reference numeral 60. The body 60 is also elongated and defines a longitudinal bore 62 extending axially therethrough. The outlet end of the conduit 56 is secured in the inlet end of the bore 62 which defines a second mixing chamber by means of suitable fasteners 64 secured through a collar or flange 66 carried by the outlet end of the conduit 56 and threadedly engaged in the body 60.

The outlet end of the body 60 has the inlet end of a mounting pipe 68 secured thereto with the mounting pipe 68 telescoped slightly into the discharge end of the bore 62. A collar 70 similar to the collar 66 and fasteners 72 similar to the fasteners 64 are utilized to removably secure the supporting pipe or mounting pipe 68 to the body 60. The outlet end of the pipe 68 is secured to the intake manifold 12 by means of a suitable mounting flange assembly 74 in the manner communicating the interior of the pipe 68 with the interior of the manifold 12.

The body 60 has a transverse bore 76 formed therethrough and the outlet end portions of a pair of inlet pipes 78 are secured to opposite sides of the body 60 in communication with the corresponding ends of the transverse bore 76 in any convenient manner such as by fasteners 79. The inlet ends of the pipes 78 each have a suitable air cleaner assembly generally referred to by the reference numeral 80 secured thereto in any convenient manner.

As can best be seen from FIGURES 5–8 of the drawings the opposite sides of the body 60 include transverse grooves 82 which open outwardly of the corresponding sides of the body and in which air-throttling plates 88 are slidingly received, the air-throttling plates 88 being disposed between the outlet ends of the inlet pipes 78 and the adjacent ends of the transverse bore 76 and interconnected by means of an arm brace 90 to which the throttle controls 92 of the internal combustion engine 10 are operatively connected.

The body 60 also includes a transverse threaded bore 94 which opens into the longitudinal bore 62 and in which one end of a vacuum conduit 96 is removably secured, the vacuum conduit 96 being operatively connected to the vacuum actuated spark advance mechanism (not shown) of the distributor (not shown) of the internal combustion engine 10 in any convenient manner.

In operation, liquid fuel such as gasoline or the like is supplied to the chamber 18 through the conduit 44 and air under pressure is supplied to the chamber 28 through the conduit 40. The pressurized air passes through the inlet nozzle 46 at a high rate of speed creating a vacuum within the chamber 18 as it enters the flared inlet end of the outlet nozzle 50 causing liquid fuel from the conduit 44 to be drawn into the chamber 18 for mixing with the air passing into the outlet nozzle 50. The liquid fuel is thus acted upon by a jet of air moving at extremely high speeds serving the dual function of drawing liquid fuel into the chamber 18 and breaking up the liquid fuel into fine particles for ready complete vaporization of the liquid fuel. As the super-rich air-and-fuel mixture passes from the body 16 through the conduit 56 to the body 60, a major portion of the liquid fuel particles are thoroughly vaporized. Additionally, as the super-rich air-and-fuel mixture from the body 16 enters the body 60, a certain amount of the air from the ambient atmosphere passing through the air cleaner assemblies 80 and into the bore 62 by means of the bore 76 is mixed with the super-rich air-and-fuel mixture from the body 16 thus providing additional air for completely vaporizing the remaining unvaporized particles of liquid fuel. The metering plates 88 are of course oscillated back and forth in the slots or channels or grooves 82 by movement of the accelerator controls 92 of the internal combustion engine 10. The spark advance mechanism of the internal combustion engine 10 may be operated in the usual manner from the vacuum conduit 96 and any suitable controls may be provided for varying the quantity of air under the pressure passing through the conduit 40 and liquid fuel passing through the conduit 44. Further, these controls (not shown) may be of the type which will vary the quantities of air and fuel in proportion to various engine operating conditions such as operating speed and operating load.

It is of course to be noted that suitable gaskets may be utilized in the connections of the various air and fuel passages of the assembly 14 and that the general shape of the conduit 56 may be varied as desired to provide an optimum location for mounting the body 16 in relation to the internal combustion engine 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A charge forming device comprising an elongated conduit including a substantially closed inlet end and an outlet end, means defining a closed cavity, an inlet nozzle for air pressurized above atmospheric pressure opening into said cavity in one direction, an outlet nozzle for said cavity axially spaced from and aligned with said pressurized air inlet nozzle, said outlet nozzle opening outwardly of said cavity in said one direction, being of appreciably larger cross-sectional area than said pressurized air inlet and including an outwardly flared inlet end opposing the outlet end of said inlet nozzle, a liquid fuel inlet opening into said cavity at a point spaced laterally of the longitudinal center axes of the adjacent ends of said nozzles, said outlet nozzle gradually increasing in effective cross-sectional area toward its outlet end, having a minimum diameter greater than the diameter of the outlet end of said inlet nozzle and opening into the closed inlet end of said conduit, a fuel and air vapor and fresh air mixing body defining an elongated passage extending therethrough including inlet and outlet ends, said outlet end of said passage being adapted for communication with the intake passages of an internal combustion engine under engine vacuum, said outlet end of said conduit opening into the inlet end of said passage, said body including means defining a pair of fresh air intake passages adapted for communication with the ambient atmosphere at their inlet ends and opening into diametrically opposite portions of said elongated passage at their outlet ends intermediate the opposite ends of said elongated passage, and adjustable air valve means operatively associated with said fresh air intake passages for controlling the passage of air therethrough, said air valve means being slide valves mounted in the outlet ends of said fresh air intake passages and said slide valves being connected by a single arm brace with a throttle control.

References Cited

UNITED STATES PATENTS

| | | |
|---|---|---|
| 1,379,346 | 5/1921 | Kings _____ 261—76 |
| 1,430,912 | 10/1922 | McElvaney et al. |
| 1,789,652 | 1/1931 | Heide. |
| 1,901,810 | 3/1933 | Heide. |
| 2,175,463 | 10/1939 | Haring _____ 261—78 X |
| 2,260,309 | 10/1941 | Funderburk _____ 261—76 X |
| 3,174,469 | 3/1965 | Rappolt _____ 261—16 X |

RONALD R. WEAVER, *Primary Examiner.*